United States Patent [19]

Inamori

[11] Patent Number: 5,686,971
[45] Date of Patent: Nov. 11, 1997

[54] STILL PICTURE GENERATING APPARATUS AND FREEZE ENCODER

[75] Inventor: Shinri Inamori, Yokohama, Japan

[73] Assignee: Texas Instruments Incorporated, Dallas, Tex.

[21] Appl. No.: 536,230

[22] Filed: Sep. 29, 1995

[30] Foreign Application Priority Data

Sep. 30, 1994 [JP] Japan .................... 6-236625

[51] Int. Cl.$^6$ ...................................... H04N 5/44
[52] U.S. Cl. ........................... 348/559; 348/24; 348/699; 348/571
[58] Field of Search .................. 348/559, 571, 348/699, 22, 24, 439, 458, 459; H04N 5/44

[56] References Cited

U.S. PATENT DOCUMENTS 5,148,276 9/1992 Furumiya ......................... 348/524

OTHER PUBLICATIONS

Journal of the Electronic Information Communication Society, Yuichi Ninomiya, "MUSE High Vision Transmission System", Dec. 1, 1990, p. 45.

IEEE Tranactions on Broadcasting, vol. BC-33, No. 4, Yuichi Ninomiya, et al., "An HDTV Broadcasting System Utilizing a Bandwidth Compression Technique" —MUSE, Dec. 1987. pp. 62-92.

*Primary Examiner*—Sherrie Hsia
*Attorney, Agent, or Firm*—Richard L. Donaldson; William B. Kempler

[57] ABSTRACT

A still picture generating apparatus which can create still pictures without deterioration in the picture quality from MUSE signals having a frame memory 32 for executing motion compensation by moving the position of the stored data by signals MVH and MVV and executes frame insertion processing by functioning together with switch 30. When the freeze operation is carried out, switch 30 selects the contact point a side and freeze encoder 62 outputs the motion vector as is in the first timing period, a signal which is half the motion vector in the second timing period, and numerical value 0 in the third timing period to frame memory 32 as signals MVH and MVV. By the operation, the positions of the data of two fields stored in frame memory 32 are superimposed by being frame inserted by the aforementioned operation and still pictures are created by executing a prescribed process.

9 Claims, 5 Drawing Sheets

STILL PICTURE GENERATING APPARATUS AND FREEZE ENCODER

FIELD OF THE INVENTION

My invention relates to a still picture generating apparatus which creates still pictures from video signals, and more particularly to a still picture generating apparatus for A MUSE receiver (decoder) that generates high-quality still pictures by motion compensation processing MUSE-encoded signals. The present invention also relates to a freeze encoder for use in a still picture generating apparatus.

BACKGROUND OF THE INVENTION

Presently, HDTV systems are being commercialized for use with satellite broadcasts, etc. Typically HDTV video signals are bandwidth-compressed before they are broadcast and then after reception bandwidth-expanded at the receiver end. For example, in Japan NHK has developed a bandwidth-compressed HDTV broadcasting system employing Multiple Sub-Nyquist Sampling Encoding (MUSE), as described by Y. Ninomiya et al. in "An HDTV Broadcasting System Utilizing a Bandwidth Compression Technique—MUSE", IEEE Transactions on Broadcasting, Vol. BC-33, No. 4, December 1987, pp. 130–160, herein incorporated by reference. The MUSE system is also disclosed in "MUSE High-Definition Transmission System (Yuichi Ninomiya, Journal of the Electronic Information Communication Society, Dec. 1, 1990)", herein incorporated by reference.

In the MUSE system, offset is applied to the sampling phase of the video signals between the fields, between the frames, and between the lines and a process in which the sampling phase circulates in four fields, namely, two frames is executed to create bandwidth compressed signals used for transmission, namely, creates MUSE signals.

A MUSE receiver or MUSE decoder which receives MUSE signals, bandwidth elongates them, and demodulates the video signals of the HDTV system decodes the video signals of HDTV system using four continuous field signals.

When restoring still pictures in A MUSE decoder, the still pictures are restored using the data stored in the memory with a capacity capable of storing four fields of video signals. Namely, a still picture of one screen created by frame inserting video signal data of four fields. The operation of the MUSE decoder which creates and holds a still picture of one screen from MUSE signals is called the freeze operation of the MUSE decoder.

The motion vector, which indicates the direction and amount of motion between the pictures of two continuous frames, is appended to the MUSE signal as a control signal for each frame, and the MUSE decoder can execute motion vector compensation processing on the video signals (picture data) of each frame.

When the MUSE decoder is executing motion vector compensation processing, there are times when the created still picture appears as a double image during the freeze operation.

The present invention was made taking the problem with the conventional technology into consideration and the objective of the present invention is to provide a still picture generating apparatus which creates high-quality still pictures by executing motion vector compensation in the freeze operation.

Also, another objective of the present invention is to provide a freeze encoder that is particularly suitable for a still picture generating apparatus.

SUMMARY OF INVENTION

The still picture generating apparatus of the present invention generates motion vector signals which do not generate double-image still pictures even after motion vector compensation using a freeze encoder.

Therefore, according to the present invention, a still picture generating apparatus is provided which has a freeze encoder for outputting horizontal motion vector and vertical motion vector input at the first field timing when the freeze signal is in the on state, outputs a value half of the vertical motion vector and a value that is half of the horizontal motion vector at the second field timing, and gives the horizontal motion vector a zero value and the vertical motion vector a zero value and then outputs them at the third field timing, frame inserting loop circuit for executing motion vector compensation using the motion vector from the freeze encoder with respect to the video signals stored in the frame memory by constituting a circuit with a switching circuit and a frame memory connected to the output terminal of the switch memory for storing one frame of video signals, the output terminal of the frame memory being connected to the first input terminal of the switching circuit, the first input terminal of the switching circuit being energized when a freeze signal is applied, and frame insertion being executed by the switching circuit and frame memory functioning together, a field memory for storing one field of video signals output from the switching circuit, and an field-inserting circuit for inputting the field video signals output from the field memory and the video signals output from the switching circuit and outputs still pictures by executing field insertion in response to the field sample signals.

Preferably, there is a frequency converting circuit for increasing the output video signals of the frame inserting loop circuit to a prescribed frequency and an offset subsampling circuit which offset sub-samples the frequency converted signals in the step after to the frame inserting loop circuit, and the offset subsampling result is applied to the field memory and the field-inserting circuit.

Specifically, the freeze encoder has a first holding circuit for holding the freeze signal during the first timing, a second holding circuit for holding the freeze signal during the second timing, a horizontal motion vector calculating circuit for calculating the half value of the horizontal motion vector, a vertical motion vector calculating circuit for calculating the half value of the vertical motion vector, a first switching circuit for selecting either the value of the horizontal motion vector or the output of the horizontal motion vector calculating circuit in response to the freeze signal held in the first circuit, a second switching circuit for selecting either the output of the first switching circuit or the zero value in response to the freeze signal held in the second holding circuit, a third switching circuit for selecting either the value of the vertical motion vector or the output of the vertical motion vector calculating circuit in response to the freeze signal held in the first holding circuit, and a fourth switching circuit for selecting either the output of the third switching circuit or the zero value in response to the freeze signal held in the second holding circuit.

Preferably, the freeze encoder has a first switching circuit and a third holding circuit coupled to the output terminal of the switching circuit and holds the field sample signal, and a field sample signal selecting circuit for selecting and outputs the field sample signal applied to the first input terminal of the fifth switching circuit and the held freeze sampling signal applied to the second input terminal of the fifth switching circuit.

Also, preferably, the freeze encoder has a fifth switching circuit applied with a field sample signal to the first input terminal, a sixth switching circuit whose output terminal is coupled to the input terminal of the fifth switching circuit, a third holding circuit coupled to the output terminal of the fifth switch and holds the field sample signal for a period of one field, a fourth holding circuit for holding the output signal from the third holding circuit for one more field, a signal inverting circuit which inverts the output of the third holding circuit, and a field sample signal selecting circuit in which the output of the signal inverting circuit is applied to the first input terminal of the sixth switching circuit, the output signal of the fourth holding circuit is applied to the second input terminal of the sixth switching circuit, the fifth switching circuit is energized in response to the field signal held in the first holding circuit, and the sixth switching circuit is energized in response to the field signal held in the second holding circuit.

Preferably, the video signals are MUSE signals, and the frame inserting loop circuit executes motion vector compensation processing and inserting processing between the first and second frame of the MUSE signals.

In an frame inserting loop circuit, frame insertion and motion vector compensation are executed according to necessity.

If the value of the horizontal motion vector and the value of the vertical motion vector are used as is, the still picture becomes a doubles image when motion vector compensation is executed, thus, in order to prevent this, the freeze encoder outputs the horizontal motion vector and vertical motion vector as is in the first field timing when the freeze signal is input, outputs half the value of the horizontal motion vector and half the value of the vertical motion vector at the second field timing, brings the horizontal motion vector to a zero value and the vertical motion vector to a zero value at the third field timing, and outputs them to the frame inserting loop circuit.

BRIEF DESCRIPTION OF THE DRAWINGS

FIGS. 4(A)–4(C) show the sampling phase of the MUSE signal.

FIGS. 5(A)–5(B) shows the operation when executing motion vector compensation processing in the frame inserting loop circuit in the still picture generating apparatus shown in FIG. 1.

FIGS. 8(A)–8(E) are timing charts showing the operation of the freeze encoder shown in FIG. 7.

FIGS. 10(A)–10(D) show the operation of the still picture generating apparatus shown in FIG. 6 for creating still pictures.

In the figures, 1 is a MUSE circuit, 3 and 3A still picture generating apparatuses, 30, 634, 636, 646, 650, 672, 682, 690, 692, 674 and 684 switches, 32 frame memory, 320 and 322 field memory, 34 frequency converting circuit, 36 offset subsampling circuit, 38 field memory, 40 field-inserting circuit, 42 frame inserting loop circuit, 62 and 66 freeze encoders, 620, 622, 630, 640, 652, 660, 662, 694, and 698 D-type flip-flops, and 632, 642, 670 and 680 are field converting circuits, 654 and 696 inverters.

DESCRIPTION OF EMBODIMENTS

Embodiment 1

The still picture generating apparatus of the present invention will be explained below with reference to FIGS. 1–5. The still picture generating apparatus is provided in the MUSE decoder shown in FIG. 1.

The constitution of the MUSE decoder 1 provided with the still picture generating apparatus and the constitution of the MUSE signal will be explained below with reference to FIGS. 1 and 2.

Figure 1:
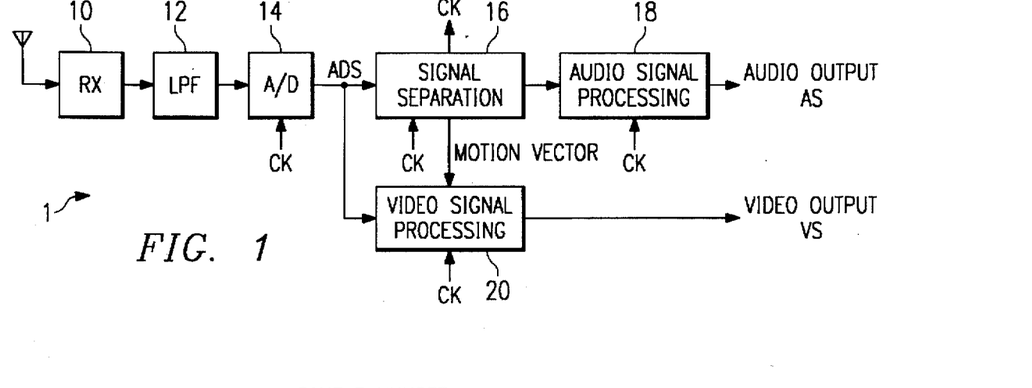
FIG. 1 shows the constitution of the MUSE decoder used in the still picture generating apparatus of the present invention.

FIG. 1 is a block diagram of MUSE decoder 1.

Figure 2:
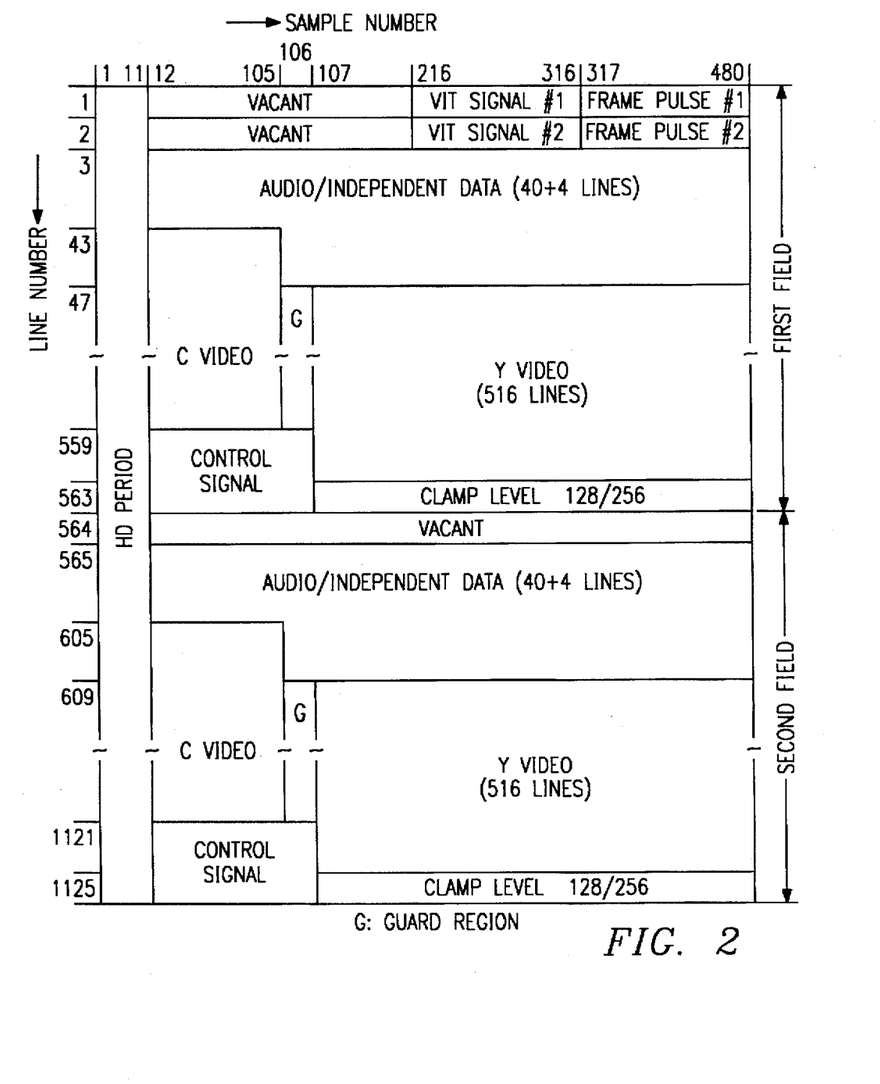
FIG. 2 shows the frame constitution of MUSE signals.

FIG. 2 shows the a frame constitution of the MUSE signal.

Video signal of one frame in the MUSE signal is composed of two fields, including the first field and the second field.

Muse decoder 1 receives the MUSE signals transmitted as a broadcast wave by bandwidth compressing the high vision video signals using the MUSE system from broadcast satellite BS, etc., and demodulates audio output AS and video output VS by demodulating the audio signals and bandwidth elongating the video signals.

MUSE decoder 1 is comprised of receiving circuit RX 10, low-pass filter (LPF) 12, analog/digital converting circuit (A/D) 14, signal separating circuit 16, audio signal processing circuit 18, and video signal processing circuit 20.

The still picture generating apparatus is provided within the video signal processing circuit 20.

Receiving circuit 10 receives the broadcast wave and extracts MUSE signals of 16.2 MHz.

Low-pass filter 12 allows only signal components of 8.1 MHz or less to pass out of the signal components of 16.2 MHz extracted by receiving circuit 10.

A/D converting circuit 14 samples the MUSE signals of 8.1 MHz filtered by low-pass filter 12 at double the sampling frequency of 16.2 MHz and converts them into MUSE signals ADS of 8-bit digital format. A/D converted digital MUSE signals are applied to signal separating circuit 16 and video signal processing circuit 20.

Signal separating circuit 16 reproduces clock signals CK of 16.2 MHz from A/D converted digital MUSE signals ADS and feeds them to each circuit of MUSE decoder 1. Signal separating circuit 16 detects the frame pulse explained below with reference to FIG. 2 and synchronizes the frame of MUSE decoder 1. Furthermore, signal separating circuit 16 separates the motion vector of the video signals and audio signals from digital MUSE signal ADS and applies them to video signal processing circuit 20 and audio signal processing circuit 18, respectively.

Audio signal processing circuit 18 processes the audio signals separated in signal separating circuit 16 and outputs audio output VS.

The video signal processing circuit 20 contains still picture generating apparatus 3 or still picture generating apparatus 3A to be discussed below, creates still pictures or moving pictures by bandwidth elongating the MUSE signals from the motion vector extracted in signal separating circuit 16 and digital MUSE signal ADS, and outputs one of the two as video output VS.

Figure 3:
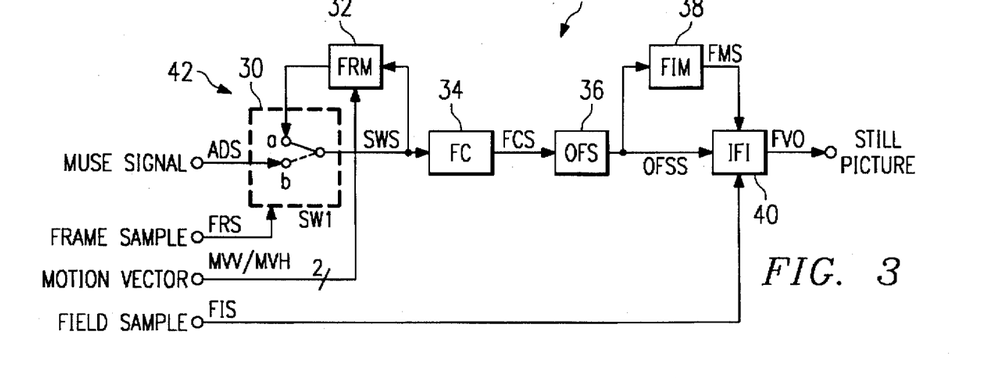
FIG. 3 shows the constitution of a still picture generating apparatus of the present invention according to the first embodiment.
Figure 4A:
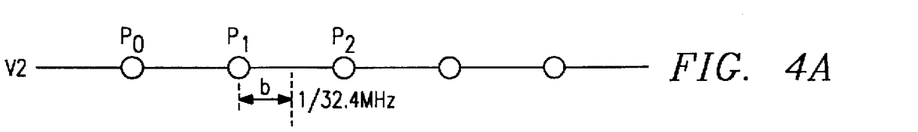
FIG. 4(A) shows the sampling phase of data $P_k$ in the initial frame.
Figure 4B:
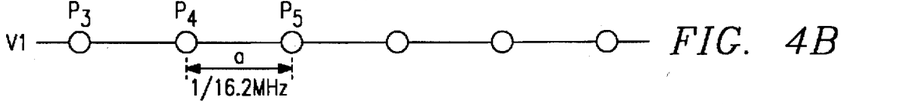
FIG. 4(B) shows the sampling phase of data $P_k^2$ in the second frame.
Figure 4C:
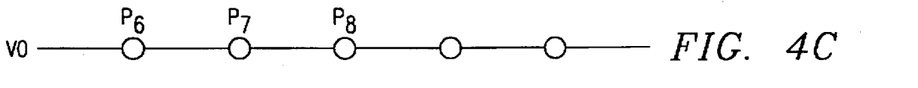
FIG. 4(C) shows the sampling phase of data $P_k'$ in the third frame.
Figure 5A:
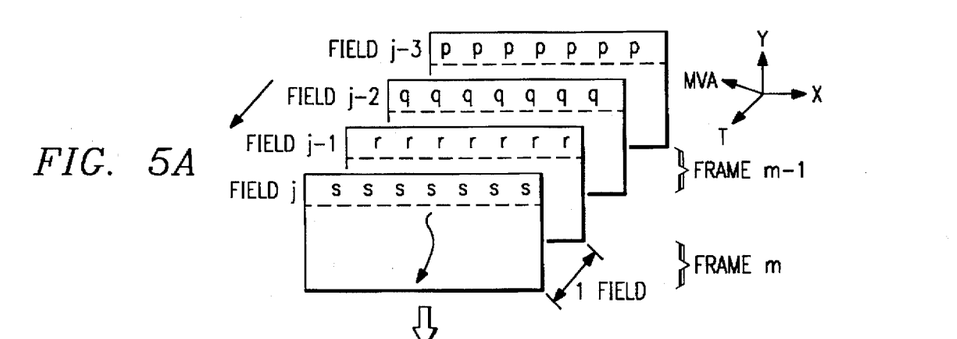
FIG. 5(A) shows four fields j-3, . . . j before undergoing frame insertion processing.
Figure 5B:
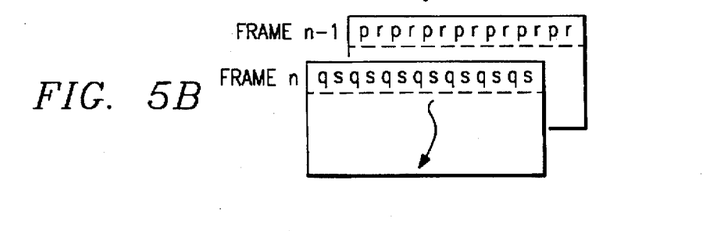
FIG. 5(B) shows two frames n-1 and n created by the frame insertion process.

Still picture generating apparatus 3 (refer to FIGS. 3–5 is used to create still pictures from MUSE signals in video signal processing circuit 20.

The still picture generating apparatus 3 in the first embodiment will be explained below with reference to FIGS. 3–5.

FIG. 3 is a block diagram of still picture generating apparatus 3.

Still picture generating apparatus 3 is comprised of switch 30, frame memory 32, frequency converting circuit FC 34, offset subsampling circuit OFS 36, field memory FIM 38, and field-inserting circuit IFI 40.

Switch 30 and frame memory 32 compose frame inserting loop circuit 42.

The 16.2-MHz digital MUSE signal ADS converted in A/D converting circuit 14 shown in FIG. 1 is input into frame inserting loop circuit 42 of still picture generating apparatus 3 provided in video signal processing circuit 20.

Switch 30 of frame inserting loop circuit 42 is energized at contact point a when the logic level of frame sample signal FRS is 1, switch 30 and frame memory 32 compose frame inserting loop circuit for creating still pictures by comprising a closed loop, contact point b is energized when the logic level of frame sample signal FRS is 0, and digital MUSE signal ADS applied to the second contact point of switch 30 is output from switch 30.

Frame memory 32 stores output digital MUSE signals of frame memory 32 or digital MUSE signals ADS selected by switch 30, executes motion compensation processing in response to the motion vector input from signal separating circuit 16, then outputs it to switch 30 after being delayed by the time 1125H (line) of one frame.

The frame insertion process in frame inserting loop circuit 42 will be explained below in further detail with reference to FIGS. 4(A)–4(C).

FIGS. 4(A)–4(C) show the sampling phase of the MUSE signal, FIG. 4(A) shows the data series (sampling phase) of two frames before V2, FIG. 4(B) shows the data series of one frame before V1, and FIG. 4(C) shows the data series of the present field V0.

Data of each frame is arranged in time series in sampling cycle a=1/16.2 MHz.

Data of two frames before V2 and data of one frame before V1 or the data of one frame before V1 and data of the present field V0 are displaced by only half of sampling cycle b (1/32.4 MHz).

Therefore, the frequency of frame sample signal FRS is 32.4 MHz and signal SWS selected and output from switch 30 has a frequency 32.4-MHz.

Data of the present field V0 is applied to contact point (b) of switch 30. The data delayed in frame memory 32 becomes 32.4 MHz data by interpolating data P0 between data P3 and P4 and interpolating data P1 between data P4 and P5, and when they are newly inter-frame interpolated by digital MUSE signal ADS from switch 30, data P4 is interpolated between data P6 and P7, data P5 is interpolated between data P7 and P8, and data P0, P1, and P2 are eliminated by being overwritten in frame memory 32.

32.4-MHz data frame inserted as described above is frequency converted into data with a frequency of 48.6 MHz, which is 3/2 times 32.4 MHz, in frequency converting circuit 34, which has a built-in a digital filter circuit.

Offset subsampling circuit 36 creates offset sampling signals OFSS with a frequency of 24.3 MHz by thinning out frequency converted MUSE signals FCS with a frequency of 48.6 MHz by 1/2.

Offset sampling signal OFSS is applied to field memory 38 and field-inserting circuit 40.

Offset sampling signal OFSS and offset sampling signal FMS delayed by only one field in field memory 38 are field insertion processed in field-inserting circuit 40, and a field inserted MUSE signal with a frequency of 48.6 MHz is output as the still picture FVO.

In this way, still picture generating apparatus 3 outputs still pictures VFO using digital MUSE signals ADS stored in frame memory 32 when a freeze signal is applied by energizing switch 30 to the contact point a side, in other words, without applying digital MUSE signals ADS applied to contact point b.

Above, the case in which the still picture generating operation is carried out without motion vector compensation in frame memory 32 was discussed. The case in which the still picture generating operation is carried out using motion vector compensation in frame memory 32 will be discussed.

Motion vector compensation executes positional correction in the vertical direction and/or horizontal direction with respect to the MUSE signals stored in frame memory 32 by changing the delay according to 4-bit horizontal component signals of motion vector MVH and 3-bit vertical component signals of motion vector MVV in frame memory 32.

The details will be explained below with reference to FIGS. 5(A)–5(B). Namely, operation of still picture generating apparatus 3 when executing motion compensation processing will be explained by focusing on the relationship between data of a number of fields.

FIGS. 5(A)–5(B) shows the operation when executing motion compensation processing in frame inserting loop circuit 42 of still picture generating apparatus 3 shown in FIG. 3, FIG. 5(A) shows the data arrangement of four fields j-3~j prior to frame insertion processing, and FIG. 5(B)

shows the arrangement of data in two frames n-1 and n, which were frame insertion processed.

Data of frames m-1 and m successively input to switch 30 of frame inserting loop circuit 42 comply with the motion in the horizontal direction and vertical direction indicated by motion vector mva.

As indicated by p, q, r, and s in FIGS. 5(A) and 5(B), the data of field j-3 in frame m-1 is dislocated by a half sampling cycle with respect to the corresponding data of field j-1 in frame m, and the corresponding data of field j-2 in frame m-1 is displaced by a half cycle with respect to the corresponding data of field j in frame m.

Field j-3 in frame m-1 corresponds to the first field shown in FIG. 2 and field j-2 corresponds to the second field. Similarly, field j-1 in frame m corresponds to the first field and field j corresponds to the second field.

Frame inserting loop circuit 42 creates frame inserted data of frame n-1 composed of data in fields j-3 and j-1 by moving data of field j-3 in frame m-1 by the amount areed by motion vector mva and frame inserted data of field j-1 in frame m.

Similarly frame inserting loop circuit 42 creates frame inserted data of frame n composed of data in fields j-2 and j by moving data of field j-2 in frame m-1 and frame inserted data of field j in frame m.

Therefore, the positional relationship of data in frame n-1 and n is to be displaced by only a half vector vb of motion vector a.

When motion vector compensation is executed in this manner in frame inserting loop circuit 42, still picture FVO is output by being displaced by only vector vb from still picture generating apparatus 3, so it is displaced twice for each frame on the display device, thus the still picture is not of favorable quality. Namely, a still picture of favorable quality cannot be obtained in the first embodiment when motion vector compensation is executed.

Embodiment 2

The second embodiment solves the problem in the first embodiment.

Next, still picture generating apparatus 3A, which is an improvement over still picture generating apparatus 3, will be explained below as the second embodiment with reference to FIGS. 6–10(D).

Still picture generating apparatus 3A is composed such that it prevents the double image in still pictures according to still picture generating apparatus 3 in the first embodiment, and, like still picture generating apparatus 3, still pictures are created from MUSE signals by being arranged in video signal processing circuit 20 of MUSE decoder 1 shown in FIG. 1.

Figure 6:
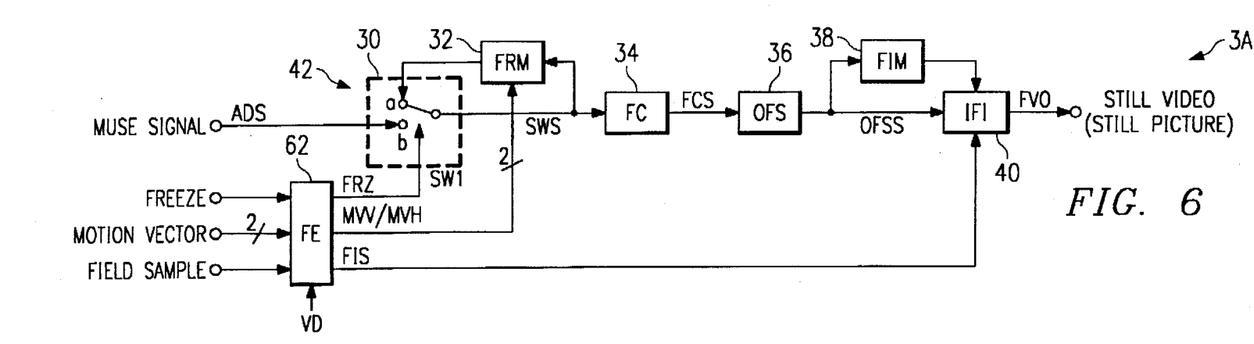
FIG. 6 shows the constitution of a still picture generating apparatus according to the second embodiment.

FIG. 6 is a block diagram of still picture generating apparatus 3A.

Still picture generating apparatus 3A is comprised of switch 30, frame memory 32, frequency converting circuit 34, offset subsampling circuit 36, field memory 38, field-inserting circuit 40, and freeze encoder 62.

In still picture generating apparatus 3A, freeze encoder 62 is appended to still picture generating apparatus 3 shown in FIG. 4. The remainder of the circuit configuration is the same as in still picture generating apparatus 3.

The constitution and operation of freeze encoder 62 will be explained below with reference to FIGS. 7 and 8(A)–8(E).

Figure 7:
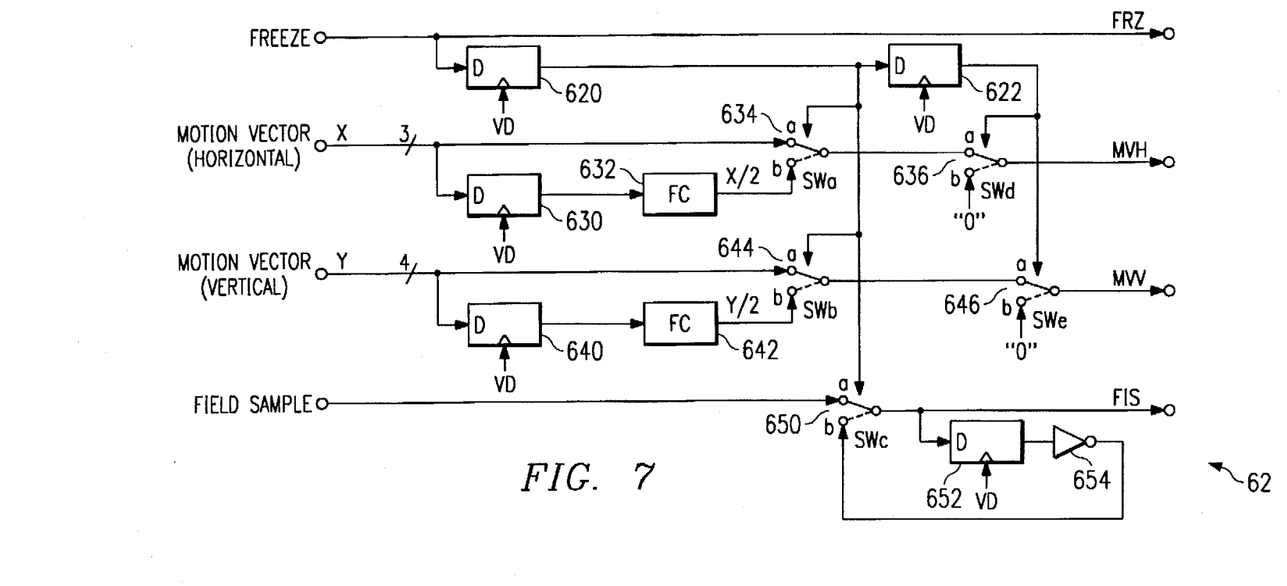
FIG. 7 shows the constitution of the freeze encoder shown in FIG. 6.

FIG. 7 is a block diagram of freeze encoder 62.

Figure 8A:
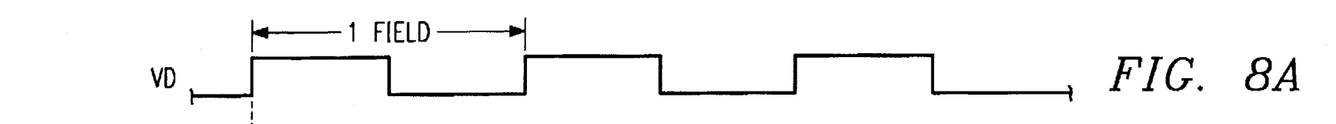
FIG. 8(A) shows the waveform of clock signal VD.
Figure 8B:
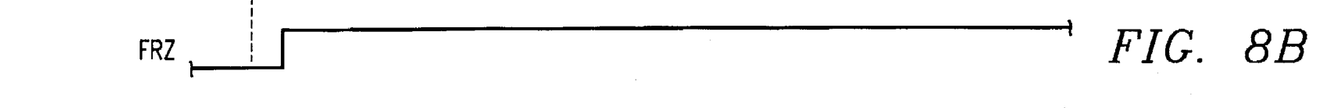
FIG. 8(B) shows the waveform of freeze signal FRZ.
Figure 8C:
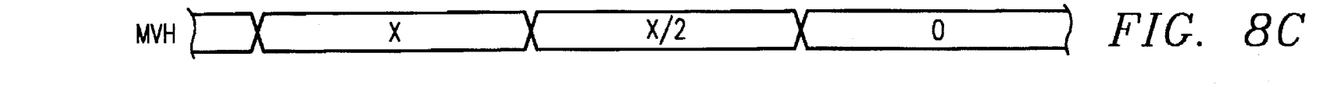
FIG. 8(C) shows horizontal component signal MVH of the motion vector.
Figure 8D:
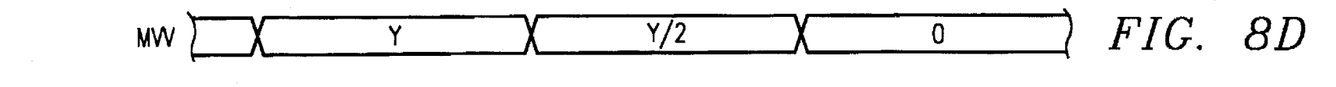
FIG. 8(D) shows vertical component signal MVV of the motion vector and FIG. 8(E) shows the waveform of field sample signal FIS.
Figure 8E:
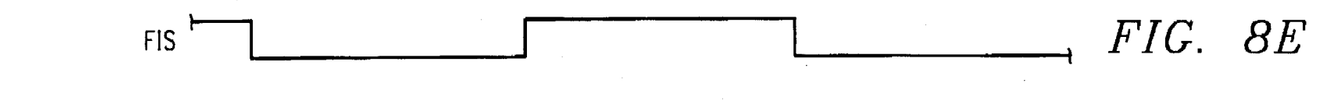

FIGS. 8(A)–8(E) are is a timing chart showing the operation of freeze encoder 62 shown in FIG. 7, FIG. 8(A) shows the waveform of clock signal VD, FIG. 8(B) shows the waveform of freeze signal FRZ, FIG. 8(C) shows the horizontal component signal of motion vector MVH, FIG. 8(D) shows the vertical component signal of motion vector MVV, and FIG. 8(E) shows the waveform of field sample signal FIS.

As shown in FIG. 7, freeze encoder 62 is comprised of D-type flip-flops 620, 622, 630, 640, and 652, first switch (SWa) 634, second switch (SWb) 644, third switch (SWc) 650, fourth switch (SWd) 636, fifth switch (SWe) 646, horizontal component field converting circuit (FC) 632, vertical component field converting circuit (FC) 642, and signal inverting circuit (inverter) 654.

As shown in FIG. 8(A), clock signal VD is a clock signal in which one cycle corresponds to one field of digital MUSE signal ADS, and is applied to the respective clock input terminal of D-type flip-flops 620, 622, 630, 640, and 652.

D-type flip-flop 620 latches freeze signal FRZ (FIG. 8(B)) input to delay input terminal (D) at the first transition point of clock signal VD. The output signal of D-type flip-flop 622 is used as control (energization) signal of switches 634, 644, and 650.

Freeze signal FRZ is the signal sent by the user of MUSE decoder 1 when a still picture is desired and becomes logic level 1 when still picture generating apparatus 3A executes operation for forming a still picture and becomes logic level 0 in other cases.

D-type flip-flop 622 latches freeze signal FRZ output from D-type flip-flop 620 at the first transition point of next clock signal VD and outputs as an energization (control) signal to switches 636 and 646. The output signal of D-type flip-flop 622 is delayed by one cycle of clock signal VD from the output signal of D-type flip-flop 620.

D-type flip-flop 630 latches horizontal component signal x of the motion vector input to input terminal (D) in the 3-bit parallel format at the first transition point of clock signal VD and outputs it to horizontal component field converting circuit 632.

Horizontal component field converting circuit 632 calculates the horizontal field conversion value signal x/2 which is half of the horizontal component signal x of the motion vector output from D-type flip-flop 630, and outputs it to contact point b of switch 634.

Switch 634 selects contact point (a) when the logic level of freeze signal FRZ output from D-type flip-flop 620 is 0 and outputs horizontal component signal x of the motion vector to contact point (a) of switch 636, and when the logic level is 1, it selects contact point b and outputs horizontal field conversion value signal x/2 to contact point a.

Switch 636 selects contact point a when the logic level of freeze signal FRZ output from D-type flip-flop 622 is 0 and selects and outputs horizontal component signal x or field conversion value signal x/2 selected in switch 634, and if the logic level is 1, contact point b is selected and numerical value 0 is output as horizontal component signal MVH.

Namely, by the operation of D-type flip-flop 630, horizontal component field converting circuit 632, and switches 634 and 636, horizontal component signal MVH and horizontal component signal x are output as is until the first transition of the first clock signal VD after freeze signal FRZ becomes logic level 1 as shown in FIG. 8(C), and in the cycle of the next clock signal VD, field conversion value signal x/2 is output as horizontal component signal MVH, and in the cycle of the next clock signal VD, numerical value 0 is output as horizontal component signal MVH. D-type flip-flop 640 latches vertical component signal y of the motion vector input to input terminal D in 4-bit parallel format at the first transition point of clock signal VD and outputs to vertical component field converting circuit 642.

Vertical component field converting circuit 642 calculates vertical field conversion value y/2, which is half of vertical component (signal value y) of the motion vector output from D-type flip-flop 640 and outputs it to contact point b of switch 644.

Switch 644 selects contact point a when the logic level of freeze signal FRZ output from D-type flip-flop 620 is 0 and outputs vertical component signal y of motion vector to contact point a of switch 646, and when the logic level is 1, contact point b is selected and vertical direction field conversion value signal y/2 is output to contact point a of switch 646.

Switch 646 selects contact point a when the signal output from D-type flip-flop 622 is at logic level 0 and selects and outputs vertical component signal y or field conversion signal y/2 output by switch 644, and if the logic level is 1, contact point b is selected and numerical value 0 is output as vertical component signal MVV.

Namely, by the operation of D-type flip-flop 640, vertical component field converting circuit 642, and switches 644 and 646, vertical component signal MVV and vertical component signal y are output as is until the first transition point of initial clock signal VD (during the first timing) from when freeze signal FRZ becomes logic level 1 as shown in FIG. 8(D), field conversion signal y/2 is output as vertical component signal MVV in the cycle of the next clock signal VD (during the second timing), and numerical value 0 is output as vertical component signal MVV at the cycle of the next clock signal VD (during the third timing).

Switch 650 selects contact point a when freeze signal FRZ output from D-type flip-flop 620 is at logic level 0, and when the logic level is 1, contact point b is selected and output as field sample signal FIS.

D-type flip-flop 652 latches the output signal of switch 650 at the first transition point of clock signal VD and outputs it to inverter 654.

Inverter 654 inverts the logic level of the output signal of D-type flip-flop 652 and outputs it to contact point b of switch 650.

When switch 650 has selected contact point b, D-type flip-flop 652 and logical circuit 654 constitute a dividing circuit which divides the frequency in half, and the logic level of the output signal of D-type flip-flop 652 inverts at the first transition point of each clock signal VD.

By the operation of switch 650, D-type flip-flop 652, and inverter 654, field sample signal FIS is output as is when freeze signal FRZ output from D-type flip-flop 620 is at logic level 0 as shown in FIG. 8(E), and when the logic level is 1, the signal which inverted the logic level of field sample signal FIS immediately before the first transition point of the signal output from D-type flip-flop 620 first is output as field sample signal FIS, and thereafter the signal in which the logic level is inverted at the first transition point of each clock signal VD is output as field sample signal FIS.

The reason for making field sample signal FIS a signal in which the logic level is inverted for each cycle of clock signal VD in freeze encoder 62 will be explained.

Field sample signal FIS is transmitted as the control signal of MUSE signal and regulates the sampling phase of each field.

Normally, field sample signal FIS is a signal in which the logic level is inverted for each field and the modulation method changes according to the transmitted motion vector. Namely, field sample signal FIS may be frame inverted or fixed to logic level 1 or logic level 0. Therefore, the value of field sample signal FIS changes every time the value of the motion vector changes.

Field sample signal FIS is used to regulate the sample phase in field-inserting circuit 40 so that when the value-of field sample signal FIS changes every time the value of motion vector changes, the output still picture signal FVO changes. Therefore, it is necessary for the waveform of field sample signal FIS to be fixed regardless of the change in the value of the motion vector.

Due to the aforementioned reason, the waveform of field sample signal FIS is fixed by using switch 650, D-type flip-flop 652, and inverter 654 in freeze encoder 62.

It was determined that field sample signal FIS should not be fixed to logic level 1 or logic level 0 and inverted for each frame in freeze encoder 62 after giving consideration to cases when the value of the motion vector is 0.

The operation of frame inserting loop circuit 42 when freeze signal FRZ is at logic level 1 will be explained below by dividing frame memory 32 into first field memory 320 and second field memory 322 with reference to FIGS. 9 and 10(A)-10(D).

Figure 10A:
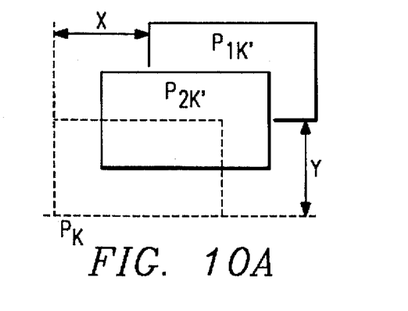
FIG. 10(A) shows the positional relationship of data $P_{1k}'$ in which the data of the first field in the frame immediately before and the frame before that has been frame inserted, data $P_{2k}'$ in which the data of the first field in the frame immediately before and the frame before that has been frame inserted, and data $P_k$ of the pertinent frame.
Figure 10B:
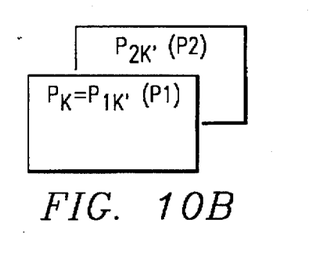
FIG. 10(B) shows the operation for executing motion compensation processing of data $P_{1k}'$ shown in FIG. 10(A) to the position of data $P_k$.
Figure 10C:
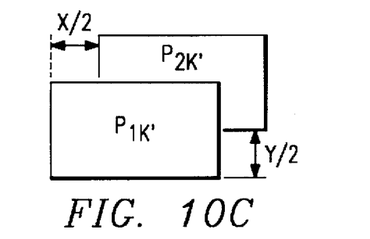
FIG. 10(C) shows the operation for executing motion compensation processing of data $P_{2k}'$ shown in FIG. 10(A) to the position of data $P_{1k}'$ $P_k$.
Figure 10D:
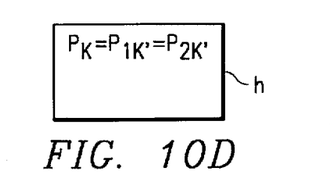
FIG. 10(D) shows the positional relationship of data $P_{1k}'$, $P_{2k}'$, and $P_k$ at the point in time that motion the movement compensation processing operation is completed.

FIGS. 10(A)-10(D) show the operation of still picture generating apparatus 3A shown in FIG. 6 for creating still pictures, FIG. 10(A) shows the positional relationship of data $P_{1k}'$ in which the data in the first field of the frame immediately before and the frame before that was frame inserted, data $P_{2k}'$ in which the data in the first field of the frame immediately before and the frame before that was frame inserted, and data $P_k$ of the pertinent frame, FIG. 10(B) indicates the motion compensation processing operation of data $P_{1k}'$ shown in FIG. 10(A) to position of data $P_k$, FIG. 10(C) shows the motion compensation processing operation of data $P_{2k}'$ shown in FIG. 10(A) to the position of data $P_{1k}'P_k$, and FIG. 10(D) shows the positional relationship of data $P_{1k}'$, $P_{2k}'$, and $P_k$ at the point in time that the motion compensation process is completed.

Data $P_{1k}'$ and $P_{2k}'$ are created by using frame inserting loop circuit 42 for frame insertion processing of the data in the first field of the frame immediately before and the frame before that and the data in the second field of the frame immediately before and the frame before that while freeze signal FRZ is at logic level 0.

The positional relationship of data $P_k$, $P_{1k}'$, and P2 is respectively displaced (x/2, y/2) at motion vector (x, y) as shown in FIGS. 10(A) and (B) at the point in time that freeze signal FRZ becomes logic level 1.

When the user of MUSE decoder 1 sets freeze signal FRZ to logic level 1, switch 30 selects contact point a and circulates the data stored in frame memory 32 within frame inserting loop circuit 42. Frame memory 32 reads and stores the data input into the input terminal every time the logic level of frame sample signal (FRS) changes. Therefore, after freeze signal FRZ is set to logic level 1, data $P_k$ of the pertinent frame indicated with the dotted line in FIG. 10(A) at position P1 indicated in FIG. 9 is eliminated without being input to frame inserting loop circuit 42.

On the other hand, as explained with reference to FIG. 7, during the period from setting freeze signal FRZ to logic level 1 to the first transition point of initial digital MUSE signal ADS, freeze encoder 62 outputs horizontal component signal x and vertical component signal y of the motion vector to frame memory 32 as horizontal component signal MVH and vertical component signal (MVV) as shown in FIGS. 8(C) and 8(D).

Figure 9:
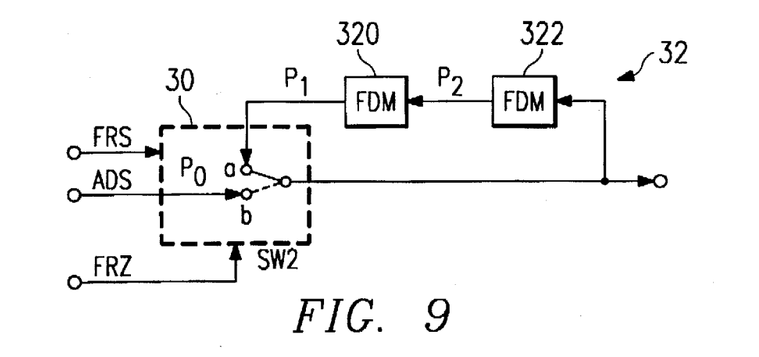
FIG. 9 shows the operation of the frame inserting loop circuit composed of the switches and frame memory shown in FIG. 6.

During this period, data $P_{1k}'$ is moved to the position of data $P_k$ as shown in FIG. 10(B), undergoes motion compensation processing, and is output to position P1 shown in FIG. 9 according to horizontal component signal MVH and vertical component signal MVV output from freeze encoder 62. Data $P_{1k}'0$ which has undergone motion compensation processing is output to frequency converting circuit 34 and then stored in field memory 322. Simultaneously, data $P_{2k}'$ is output to position (P2) in FIG. 9 from field memory 322 and stored in field memory 320.

During the period from the initial first transition point of digital MUSE signal ADS to the second first transition point, freeze encoder 62 outputs field conversion value signals x/2 and y/2 of field converting circuits 632 and 642 shown in FIG. 7 to frame memory 32 as horizontal component signal MVH and vertical component signal MVV as shown in FIGS. 8 (C) and (D).

During this period, data ($P_{2k}'$) is moved to the position of data $P_{1k}'$ $P_k$ as shown in FIG. 10(C), undergoes motion compensation processing, and is output to position (P1) shown in FIG. 9 according to horizontal component signal MVH and vertical component signal MVV input from freeze encoder 62. Data $P_{2k}'$ which has undergone motion compensation processing is output to frequency converting circuit 34 and stored in field memory 322. Simultaneously, data $P_{2k}'$ is output to position P2 in FIG. 9 from field memory 322 and stored in field memory 320.

In the period after the second first transition point of digital MUSE signal ADS, contact point b of switches 634 and 644 in freeze encoder 62 is selected so that numerical value 0 is respectively output to frame memory 32 as horizonal component signal MVH and vertical component signal MVV as shown in FIGS. 8(C) and 8(D). Therefore, motion compensation processing is not executed in frame memory 32 during this period and after data $P_{1k}'$ and data $P_{2k}'$ are coordinated at the same position, they travel through frame inserting loop circuit 42 as is. Data $P_{1k}'$ and $P_{2k}'$ which travel through frame inserting loop circuit 42 are output to frequency converting circuit 34 as switch output signal SWS.

The overall operation of still picture generating apparatus 3A will be explained below.

Digital MUSE signals ADS output from A/D converting circuit 14 shown in FIG. 1 are applied to frame inserting loop circuit 42 of still picture generating apparatus 3A.

Switch 30 of frame inserting loop circuit 42 selects contact point a when freeze signal FRZ is at logic level 1 and forces the data stored in frame memory 32 to travel through frame inserting loop circuit 42, and when freeze signal FRZ is at logic level 0, contact point b is selected and digital MUSE signal ADS of the pertinent frame is multiplied by the data output by frame memory 32 by providing a delay of one frame.

Frame memory 32 of frame inserting loop circuit 42 stores the data output from switch 30, carries out motion compensation processing in response to the motion vector, provides a delay of one frame, and outputs it to contact point a of switch 30.

Frame inserting loop circuit 42 carries out frame insertion processing when freeze signal FRZ is at logic level 1 and outputs it to frequency converting circuit 34 as switch output signal SWS.

Frequency converting circuit 34 converts output signal SWS of frame inserting loop circuit 42 into filtering signal FCS with a frequency of 48.6 MHz by filtering and outputs it to offset subsampling circuit 36.

Offset subsampling circuit 36 converts filtering signal FCS input from frequency converting circuit 5 into offset sampling signal OFSS with a frequency of 24.3 MHz and outputs it to field-inserting circuit 60.

Field memory 58 provides a delay of one field to the output signal of offset subsampling circuit 36 and outputs it to field-inserting circuit 40 as memory output signal FMS.

Field-inserting circuit 40 creates and outputs still picture signal FV by executing field insertion processing using field sample signal FIS and memory output signal FMS input from field memory 38.

By constituting still picture generating apparatus 3A as mentioned above, the positions of data $P_{1k}'$ and $P_{2k}'$ traveling through frame inserting loop circuit 42 correspond so that disadvantages of the created still pictures deteriorating and appearing as double image are not generated like in still picture generating apparatus 3 shown in the first embodiment.

The circuit of freeze encoder 62 is very simple and can be incorporated easily into the semiconductor device constituting video signal processing circuit 20 shown in FIG. 1. Therefore, it is possible to upgrade still picture generating apparatus 3 very easily to obtain still picture generating apparatus 3A.

Also, data $P_{1k}'$ and $P_{2k}'$ were comprising to be coordinated at the position of data $P_k$ in still picture generating apparatus 3A, but the position for superimposing data $P_{1k}'$ and $P_{2k}'$ is not limited to data $P_k$. For example, still picture generating apparatus 3A can be comprising to move only data $P_{1k}'$ and superimpose it on data $P_{2k}'$.

Also, according to still picture generating apparatus 3 and 3A of the present invention, it is also possible to create still picture signals without deterioration from video signals with the same signal constitution as MUSE signals in addition to MUSE signals.

Embodiment 3

Below, the third embodiment of the present invention will be explained with reference to FIG. 11.

Freeze encoder 66 explained in the third embodiment is a modified example of freeze encoder 62 in still picture generating apparatus 3A as the second embodiment.

Figure 11:
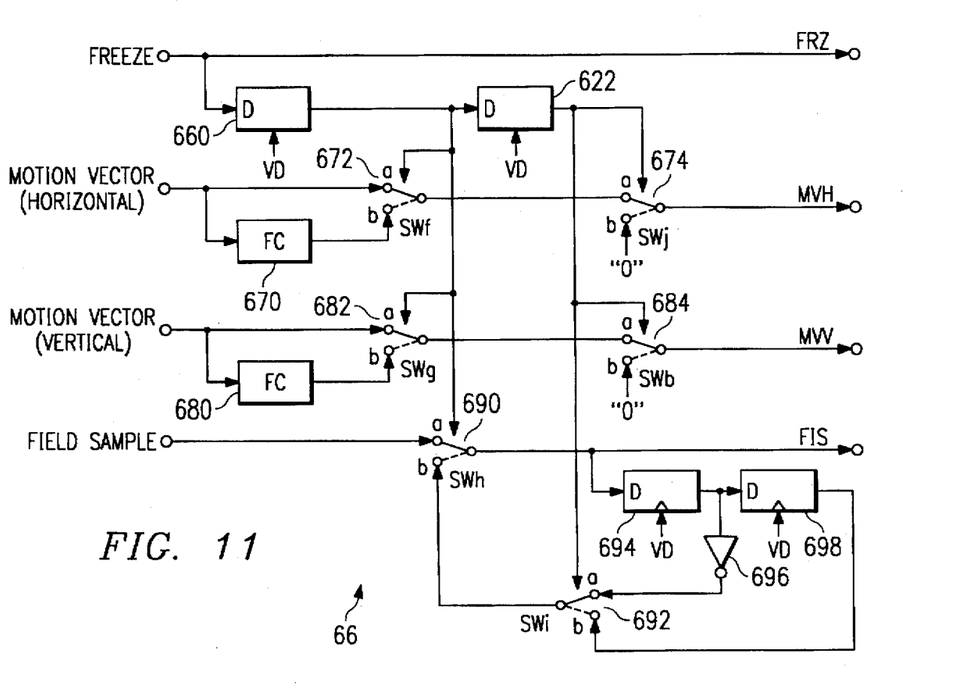
FIG. 11 shows the constitution of a freeze encoder according to the third embodiment.

FIG. 11 is a block diagram of freeze encoder 66 in the third embodiment.

As shown in FIG. 11, freeze encoder 66 is comprised of D-type flip-flops 660, 662, 694, and 698, field converting circuits 670 and 680, switch (SWf) 672, switch (SWg) 682, switch (SWh) 690, switch (SWi) 692, switch (SWj) 674, switch (SWk) 684, and inverter 696.

D-type flip-flops 660, 662, 694, and 698 within the constitutional elements of freeze encoder 66 shown in FIG. 11 are the same as D-type flip-flops 620, 622, 630, 640, and 652 of freeze encoder 62 shown in FIG. 7, field converting circuits 670 and 680 are the same as field converting circuits 632 and 642 of freeze encoder 62, inverter 696 is the same as inverter 654 of freeze encoder 62, and the functions of switches 672, 682, 690, 674, and 684 are the same as those of switches 634, 644, 650, 636, and 646 of freeze encoder 62.

Freeze encoder 66 omits the processing shown in FIGS. 10(B) and (C) and executes the processing shown in FIG. 10(A) directly that shown in FIG. 10(D) in the field in which the freeze signal has become logic level 1.

Data output to the initial field, in which the freeze signal has become logic level 1, from frame inserting loop circuit 42 in still picture generating apparatus 3A using freeze encoder 62 undergoes motion compensation in response to the field conversion value output from field converting circuits 632 and 642, thus it does not indicate the sampling phase accurately.

In freeze encoder 66 shown in the third embodiment, field sample signal FIS of field alternation is created using the sampling phase of the field following the initial field when the freeze signal becomes logic level 1.

In the initial field, switches 672, 682, and 690 respectively select the contact point (a) side according to the output signal of D-type flip-flop 660 and outputs horizontal component signal MVH, horizontal component signal MVV, and the field sample signal.

Next, switches 672 and 682 select the contact point b side with freeze signal FRZ delayed by one field output from D-type flip-flop 660 and the results of field converting circuits 670 and 680 are output.

At this time, switch 692 selects the contact point b side according to the output signal of D-type flip-flop 662 and outputs field sample signal FIS of one previous frame to contact point b of switch 690. Also, switch 690 selects the contact point b side with freeze signal FRZ delayed by one field output from D-type flip-flop 660 and field sample signal FIS of one previous frame is output.

Next, switch 692 selects the contact point (a) side with freeze signal FRZ delayed by two fields output from D-type flip-flop 662 and outputs field sample signal FIS.

When motion vector compensation is executed in frame inserting loop circuit 42 using the motion vector signal generated in freeze encoder 66, the still picture is not a double image.

The explanation given above was for a case in which MUSE signals are used as the video signals, but it is not limited to still pictures of MUSE signals and is the same as the embodiments when creating still pictures from similar video signals.

As explained above, according to the still picture generating apparatus of the present invention, it is possible to prevent the generation of double-image still pictures created during the motion vector compensation when creating still pictures by bandwidth elongating video signals, for example, MUSE signals.

Moreover, in the still picture generating apparatus of the present invention, a freeze encoder with a simple circuit configuration need only be added.

I claim:

1. A still picture generating apparatus comprising: a freeze encoder for (i) outputting horizontal and vertical motion vectors input at a first field timing as is when a freeze signal is in an on state, (ii) outputting a value half of the vertical motion vector and a value half of the horizontal motion vector at a second field timing, and (iii) setting the horizontal motion vector to a zero value and the vertical motion vector to a zero value for output at a third field timing;

a frame inserting loop circuit for executing motion vector compensation using a motion vector from the freeze encoder with respect to video signals stored in a frame memory by constituting a circuit with a switching circuit and the frame memory connected to the output terminal of a switch memory, for storing one frame of the video signals, an output terminal of the frame memory being connected to a first input terminal of the switching circuit, the first input terminal of the switching circuit being energized when the freeze signal is applied and frame insertion being executed by the switching circuit and the frame memory functioning together;

a field memory for storing one field of the video signals output from the switching circuit; and a field-inserting circuit for inputting filed video signals output from the field memory and the video signals output from the switching circuit and for executing field insertion in response to field sample to generate still pictures.

2. The still picture generating apparatus of claim 1 further comprising a frequency converting circuit for increasing the output video signals of the frame inserting loop circuit to a prescribed frequency; an offset subsampling circuit for offset subsampling frequency converted signals in response to the frame inserting loop circuit and applying the offset subsampling result to the field memory and the field-inserting circuit.

3. The still picture generating apparatus of claim 1 in which the freeze encoder comprises a first holding circuit for holding the freeze signal during the first field timing, a second holding circuit for holding the freeze signal during the second field timing, a horizontal motion vector calculating circuit for calculating the half value of the horizontal motion vector, a vertical motion vector calculating circuit for calculating the half value of the vertical motion vector, a first switching circuit for selecting either the value of the horizontal motion vector or the output of the horizontal motion vector calculating circuit in response to the holding freeze signal of the first holding circuit, a second switching circuit for selecting either the output of the first switching circuit or the zero value in response to the freeze signal held in the second holding circuit, a third switching circuit for selecting either the value of the vertical motion vector or the output of the vertical motion vector calculating circuit in response to the freeze signal held in the first holding circuit, and a fourth switching circuit for selecting either the output of the third switching circuit or the zero value in response to the freeze signal held in the second holding circuit.

4. The still picture generating apparatus of claim 3 further comprising a fifth switching circuit and a third holding circuit coupled to the output terminal of the fifth switching circuit and holds a field sample signal, and a field sample signal selecting circuit for selecting and outputting the field sample signal applied to the first input terminal of the fifth switching circuit and the held field sample signal applied to the second input terminal of the fifth switching circuit.

5. The still picture generating apparatus of claim 3 further comprising a fifth switching circuit applied with a field sample signal to a first input terminal, a sixth switching circuit whose output terminal is coupled to a second input terminal of the fifth switching circuit, a third holding circuit coupled to the output terminal of the fifth switching circuit and holds the field sample signal for a period of one field, a fourth holding circuit for holding a signal output from the third holding circuit for one more field, a signal inverting circuit which inverts the output of the third holding circuit, and a field sample signal selecting circuit in which the output of the signal inverting circuit is applied to the first input terminal of the sixth switching circuit, the output signal of the fourth holding circuit is applied to the second input terminal of the sixth switching circuit, the fifth switching circuit is energized in response to the freeze signal held in the first holding circuit, and the sixth switching circuit is energized in response to the freeze signal held in the second holding circuit.

6. The still picture generating apparatus of claim 4 in which the video signals are MUSE signals and the frame inserting loop circuit executes motion vector compensation processing and inserting processing between the first and second frame of the MUSE signals.

7. A freeze encoder comprising:

a first holding circuit for holding a freeze signal during a first timing, a second holding circuit for holding the freeze signal during a second timing, a horizontal motion vector calculating circuit for calculating the half value of a horizontal motion vector, a vertical motion vector calculating circuit for calculating the value of a vertical motion vector, a first switching circuit for selecting either the value of the horizontal motion vector or the output of the horizontal motion vector calculating circuit in response to the holding freeze signal held in the first holding circuit, a second switching circuit for selecting either the output of the first switching circuit or zero value in response to the freeze signal held in the second holding circuit, a third switching circuit for selecting either the value of the vertical motion vector or the output of the vertical motion vector calculating circuit in response to the freeze signal held in the first holding circuit, and a fourth switching circuit for selecting either the output of the third switching circuit or the zero value in response to the freeze signal held in the second holding circuit.

8. The freeze encoder of claim 7 further comprising a fifth switching circuit and a third holding circuit coupled to the output terminal of the fifth switching circuit and holding a field sample signal, and a field sample signal selecting circuit for selecting and outputting the field sample signal applied to the first input terminal of the fifth switching circuit and the held field sample signal applied to the second input terminal of the fifth switching circuit in response to the freeze signal held in the first holding circuit.

9. The freeze encoder of claim 7 further comprising a fifth switching circuit applied with a field sample signal to a first input terminal, a sixth switching circuit whose output terminal is coupled to the second input terminal of the fifth switching circuit, a third holding circuit coupled to the output terminal of the fifth switching circuit and holding the field sample signal for a period of one field, a fourth holding circuit for holding the output signal from the third holding circuit for one more field, a signal inverting circuit which inverts the output of the third holding circuit, and a field sample signal selecting circuit for applying the output of the signal inverting circuit to the first input terminal of the sixth switching circuit, the output signal of the fourth holding circuit being applied to the second input terminal of the sixth switching circuit, the fifth switching circuit is energized in response to the freeze signal held in the first holding circuit, and the sixth switching circuit is energized in response to the freeze signal held in the second holding circuit.

\* \* \* \* \*